United States Patent [19]

Decker et al.

[11] 4,374,935
[45] Feb. 22, 1983

[54] PROCESS FOR THE PREPARATION OF FLEXIBLE POLYURETHANE FOAMS EMPLOYING POLYESTER-POLYETHER POLYOL MIXTURES

[75] Inventors: Walter Decker, Ludwigshafen; Ernst Schoen, Neustadt; Herbert Grabhoefer, Ludwigshafen; Peter Weyland, Frankenthal, all of Fed. Rep. of Germany

[73] Assignee: BASF Aktiengesellschaft, Ludwigshafen, Fed. Rep. of Germany

[21] Appl. No.: 336,878

[22] Filed: Jan. 4, 1982

[30] Foreign Application Priority Data

Jan. 10, 1981 [DE] Fed. Rep. of Germany ....... 3100524

[51] Int. Cl.³ .................. C08G 18/14; C08G 18/42; C08G 18/32
[52] U.S. Cl. ................................. 521/173; 252/182; 521/51; 521/914
[58] Field of Search .............. 521/173, 51, 914; 252/182

[56] References Cited

U.S. PATENT DOCUMENTS

| | | | |
|---|---|---|---|
| 2,998,403 | 8/1961 | Mueller et al. | 260/45.4 |
| 3,207,709 | 9/1965 | Merten et al. | 260/2.5 |
| 3,211,701 | 10/1965 | Mueller et al. | 260/75 |
| 3,461,086 | 8/1969 | Mogford et al. | 521/914 |

*Primary Examiner*—H. S. Cockeram
*Attorney, Agent, or Firm*—Norbert M. Lisicki

[57] ABSTRACT

The invention concerns a process for the preparation of flexible polyurethane foams having good hydrolytic stability, improved damping, with equal or higher levels of other physical properties and with a high absorption capacity. The foams are prepared by reacting organic polyisocyanates and mixtures of (a) liquid polyester polyols, which are produced by the polycondensation of organic dicarboxcylic acid and a polyol mixture which contains 1,4-butanediol, 1,5-pentanediol, 1,6-hexanediol, and at least one triol, and (b) di- to tetra-functional polyether polyols having molecular weights of 1500 to 6000 in the presence of catalysts and blowing agents as well as optionally chain extenders, auxiliaries, and additives.

7 Claims, 2 Drawing Figures

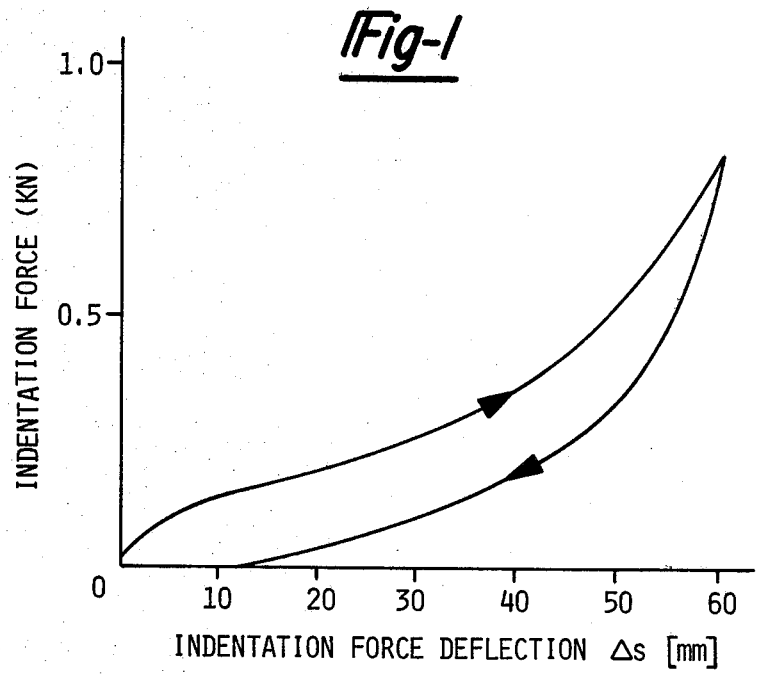
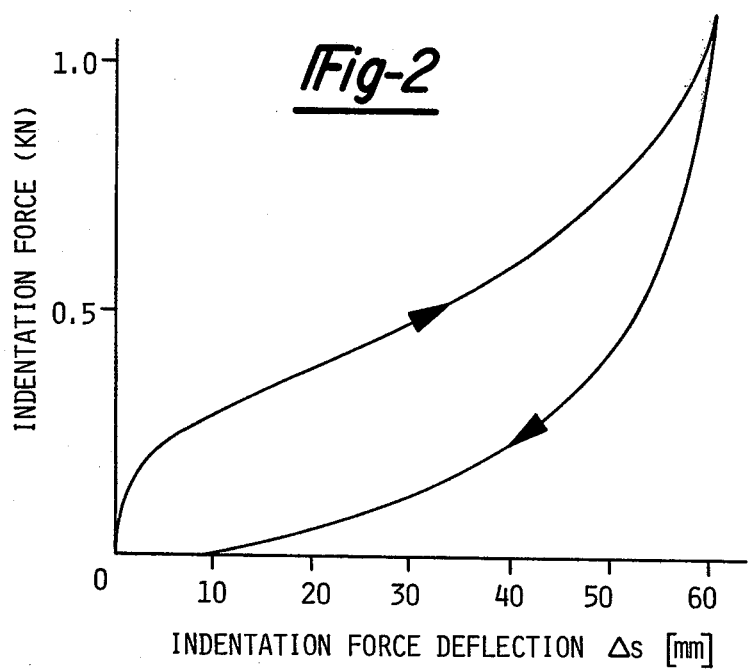

PROCESS FOR THE PREPARATION OF FLEXIBLE POLYURETHANE FOAMS EMPLOYING POLYESTER-POLYETHER POLYOL MIXTURES

BACKGROUND OF THE INVENTION

1. Field of the Invention

The invention concerns a process for the preparation of flexible polyurethane foams having a good resistance to hydrolysis, improved damping with equivalent or improved physical properties, and high sound absorption capacity. The polyurethane foams are prepared by reacting organic polyisocyanates with mixtures of (a) liquid polyester polyols produced by the polycondensation of organic dicarboxylic acids and a polyol mixture containing 1,4 butanediol, 1,5 pentanediol, 1,6 hexanediol, and at least one triol, and (b) di- to tetra-functional polyether polyols having molecular weights of 1500 to 6000, in the presence of catalysts and blowing agents as well as optionally chain extenders, auxiliaries, and additives.

Selected polyester-polyether polyol mixtures which are employed in the process of this invention exhibit improved compatibility of the components and storage stability.

2. Description of the Prior Art

The preparation of polyurethane flexible foams is essentially known and is described in detail in the appropriate literature. The plastics handbook Volume VII "Polyurethanes" by R. Vieweg, A. Hoechtlen, Carl Hanser Publishers, Munich, 1966 is such an example.

In addition to catalysts, blowing agents, auxiliaries, and additives, toluene diisocyanates are used for the preparation of polyurethane flexible foams. In consideration of toxicity and reactivity, mixtures of toluene diisocyanates and crude diphenylmethane diisocyanates may be employed.

Preferably used as the polyhydroxyl compounds are polyether polyols particularly those based on ethylene and/or propylene oxide. One drawback of the polyurethane flexible foams produced from these polyols, is that the general physical properties do not meet the requirements in all areas of application.

If specific requirements are made of the physical property level of polyurethane flexible foams for definite areas of application, polyester polyols may be used for their preparation instead of the polyether polyols. However, the resultant foams have a low resistance to hydrolysis.

In order to reduce these drawbacks, German published Application No. 28 15 540 suggests the selection of certain starting components for the preparation of polyurethane flexible foams and the use of a urethane group containing mixture of diphenylmethane diisocyanates and polymethylene polyphenylene-polyisocyanates containing 55 to 85% by weight of diphenyl diisocyanates isomers as the polyisocyanates, polyester polyols or mixtures of polyester polyols and polyether polyols with a polyester polyether content of at least 60% by weight as polyhydroxyl compounds and water and mixtures of water or low boiling, optionally halogen containing hydrocarbons as the blowing agents.

Specific mention is made of polyester polyols having a molecular weight of 750 to 5000 and a functionality of 2 to 3.5 which are produced by the condensation of a dicarboxylic acid mixture consisting of succinic, glutaric, and adipic acids in certain quantity ratios and di- and trifunctional alcohols. In this manner polyurethane flexible foams can be obtained which have a high load bearing and energy absorption capacity as well as considerable resistance to hydrolysis.

However, even if this process is employed certain difficulties can occur in processing the polyester-polyether polyol mixtures, since the polyester polyols and polyether polyols described require correct mixing in order to avoid phase separation. This chemical behavior is not surprising since it is known from the literature that polyester polyols and polyether polyols for polyurethane flexible foams are not miscible (plastics handbook Volume VII, "Polyurethane" by R. Vieweg and A. Hoechtlen, Carl Hanser Publisher, Munich, 1966, Page 52).

Even small amounts of polyester polyol in polyether polyol and vice versa can disturb the processability of one or the other, resulting in cracks, voids, and cell disturbances in the resulting foam which in extreme cases may even result in a collapse of the foam. Tanks, lines, and foaming equipment must be cleansed extremely thoroughly when changing from polyester polyol to polyether polyols and vice versa.

Another drawback of commercially available polyester polyols is the low resistance to hydrolysis which is not improved by being incorporated in the polyurethane foam structure. The purpose of this invention is to produced flexible polyurethane foams with good resistance to hydrolysis and improved mechanical properties and particularly with a high compression strength and favorable damping behavior. Surprisingly, this can be accomplished by using mixtures of specific polyester polyols and polyether polyols as the polyhydroxyl compounds in the preparation of the flexible polyurethane foams.

BRIEF DESCRIPTION OF THE DRAWINGS

FIG. 1 is a deformation diagram.

FIG. 2 is another deformation diagram.

DESCRIPTION OF THE PREFERRED EMBODIMENT

This invention relates to a process for the preparation of flexible polyurethane foams by reacting organic polyisocyanates, polyhydroxyl compounds, and optionally chain extenders in the presence of catalysts and blowing agent, as well as auxiliaries and additives wherein the mixtures of polyhydroxyl compounds consist of a. liquid polyester polyols with hydroxyl numbers of 40 to 80 and molecular weights of 1500 to 5000, which are prepared by the polycondensation of organic dicarboxylic acids with a polyol mixture which contains based on the total weight of the polyester: 10 to 50 percent by weight of 1,4-butanediol, 30 to 60 percent by weight of 1,5-pentanediol, 8 to 35 percent by weight of 1,6-hexanediol, and 2 to 15 percent by weight of at least one triol, and b. di- to tetra-functional polyether polyols having molecular weights of 1500 to 6000.

This invention further relates to polyester-polyether polyol mixtures which consist of a. 10 to 20 percent by weight based on the total weight of components (a) and (b) a liquid polyester polyol having a hydroxyl number of 40 to 80 prepared by the polycondensation of adipic acid with a polyol mixture which based on the total polyol weight contains 10 to 50 percent by weight of 1,4-butanediol, 30 to 60 percent by weight of 1,5-pentanediol, 8 to 35 percent by weight of 1,6 hexanediol, and 2 to 15 percent by weight glycerine and/or trimethylolpropane, and b. 90 to 80 percent by weight based on the total weight of components (a) and (b) a glycerine and/or trimethylolpropane initiated polyoxypropylene-polyoxyethylene triol having a hydroxyl number of 28 to 60.

Surprisingly, it was found that the usable mixtures of polyester polyols and polyether polyols are very compatible and miscible in quantities of 5 to 50 percent by weight to 95 to 50 percent by weight based on the total weight of polyol. Specifically selected mixtures are storage stable for more than six months so that they can be shipped as polyurethane systems.

The flexible polyurethane foams produced according to this invention have a very high compression strength and at the same time improved damping behavior. This results in totally new property combinations for highly stressed vehicle seats of polyurethane flexible foam which could not previously be achieved. The reduction in the compression strength after high humidity aging in accordance with DIN 53 578 is very small and corresponds approximately with the drop in the compression strength of a pure polyether based polyurethane flexible foam. The products further excel by their excellent sound absorption in a frequency range of 2 to $6 \times 10^3$ Hertz. They can furthermore be processed using methods of high frequency welding and flame lamination.

For the preparation of the flexible polyurethane foams according to the process of this invention, mixtures of a. 5 to 50 percent by weight of at least one liquid polyester polyol having a hydroxyl number of 40 to 80, preferably 45 to 70, and a molecular weight of 1500 to 5000, preferably 1700 to 4000 and b. 95 to 50 percent by weight preferably 90 to 80 percent by weight of at least one di- to tetrafunctional polyether polyol having a molecular weight of 1500 to 6000, preferably 3000 to 4000, are used as polyhydroxyl compounds with the percentages by weight based on the total weight of components (a) and (b).

By way of example, suitable polyester polyols having an average functionality of 3.5 maximum, preferably 2.2 to 3.0 and an acid number of less than 3, preferably between 0.5 to 2.0 KOH/gram are produced, by polycondensation of organic dicarboxylic acids having 2 to 12 carbon atoms, preferably aliphatic dicarboxylic acids having 4 to 6 carbon atoms, with the polyol mixtures to be used according to this invention. The polyester polyols obtained in this manner may be used individually or in mixtures.

Examples of organic dicarboxylic acid include: aliphatic dicarboxylic acids such as adipic, subaric, azelaic, and sebacic acid as well as aromatic dicarboxylic acid such as phthalic acid, isophthalic acid, and terephthalic acid. The organic dicarboxylic acids may be used individually as well as in mixtures with each other. Preferably used, however, is adipic acid. Instead of the free dicarboxylic acids the corresponding carboxylic acid derivatives such as dicarboxylic acid ester of alcohols having 1 to 4 carbon atoms or dicarboxylic anhydride may be used.

Polyol mixtures in the sense of this invention are those which contain based on the total weight of the polyol mixture:

10 to 50 percent by weight, preferably 15 to 40 percent by weight of 1,4-butanediol, 20 to 60 percent by weight, preferably 40 to 55 percent by weight of 1,5-pentanediol, 8 to 35 percent by weight, preferably 12 to 30 percent by weight of 1,6-hexanediol, and 2 to 15 percent by weight, preferably 2 to 20 percent by weight of one or more triols.

Glycerine and trimethylolpropane have proven to work particularly well as triols so that these are preferably used alone or as a mixture.

Mixtures of butane-, pentane-, and hexane-diols may be produced by catalytic hydrogenation of a mixture of succinic, glutaric, and adipic acids, for example, corresponding with the data in German published Application OS 23 21 101, and subsequent purification of the diol mixtures according to commonly applied methods.

The polyester polyols to be used in accordance with this invention are produced according to well-known processes by the polycondensation of preferably one aliphatic saturated dicarboxylic acid or possibly a dicarboxylic acid mixture with the polyol mixture at temperatures of 100° to 250° C., preferably 130° to 220° C., in the presence of well-known esterification catalysts such as organic compounds of titanium, vanadium or tin. Benzene, toluene, xylene, or chlorobenzene may be employed for the azeotropic distillation of the water of reaction, preferably under reduced pressure, at the end of the esterification.

As previously indicated, polyether polyols having molecular weights of 1500 to 6000, preferably 3000 to 4000 and functionalities of 2 to 4, preferably 2.5 to 3.5 are suitable for mixing with the above described polyester polyols. The polyether polyols are produced according to well-known processes from one or more alkylene oxides having 2 to 4 carbon atoms in the alkylene radical and an initiator molecule containing 2 to 4, preferably 2 to 3, active hydrogen atoms. Suitable alkylene oxides include, for instance, ethylene oxide, 1,2-propylene oxide, 1,2- and/or 2,3-butylene oxide. Tetrahydrofuran and styrene oxide may also be employed. Ethylene oxide and 1,2-propylene oxide are preferred. The alkylene oxides may be polymerized individually, alternatingly in sequence or in the form of heteric mixtures. If the resultant polyether polyols have predominately secondary hydroxyl end groups, they may be transformed into primary hydroxyl groups by the addition polymerization of 2 to 3 percent by weight of ethylene oxide based on the overall weight of the applied alkylene oxides thus increasing the reactivity of the polyols.

Possible, initiator molecules include: water, ammonium, hydrazine, organic dicarboxylic acids such as succinic acid, adipic acid, phthalic acid and terephthalic acid; N,N'-dialkyl substituted diamines having 1 to 4 carbon atoms in the alkyl radical such as dialkyl substituted ethylenediamine 1,2-and/or 1,3-propylenediamine, 1,4-butylenediamine, 1,6-hexamethylenediamine; 2,4-, 2,2'- and 4,4'-diamino diphenylmethane; N-alkyldialkanolamines and trialkanolamines, such as N-methyldiethanolamine and triethanolamine and preferably di- to tetra-functional particularly di- to tri-functional polyols such as ethylene glycol, propylene glycol, diethylene glycol, dipropylene glycol, 1,4-butanandiol, 1,6-hexanediol, glycerine, trimethylolpropane and pentaerythritol. Preferably used are glycerine and trimethylolpropane.

Commonly used catalysts for the polymerization of the alkylene oxides are Lewis acids or their complex salts with carboxylic acid anhydrides, alkali alkoxides having 1 to 4 carbon atoms in the alkyl radical, such as sodium and potassium methylate, potassium isopropylate, and sodium butylate and preferably alkali hydroxides, such as sodium hydroxide and preferably potassium hydroxide. The catalyst is usually used in concentrations of 0.002 to 1.0, preferably 0.01 to 0.5 percent by weight based on the overall weight of the starting components.

The described polyether polyols as well as the polyester polyols to be used according to this invention may be used individually or as mixtures.

The use of storage stable mixtures has proven to be particularly advantageous since these can be transported in a space-saving manner. As a two-component system, they can be stored on an interim basis and they can be processed without problem on commonly used foaming equipment resulting in polyurethane flexible foams with excellent physical properties. The storage stable mixtures primarily consist of a. 5 to 50 percent by weight, preferably 10 to 20 percent by weight based on the total weight of components (a) and (b) of a liquid polyester polyol having a hydroxyl number of 40 to 80 produced by the polycondensation of adipic acid with a polyol mixture containing based on the overall polyol weight: 10 to 50 percent by weight of 1,4-butanediol, 30 to 60 percent by weight of 1,5-pentanediol, 8 to 35 percent by weight of 1,6-hexanediol, and 2 to 15 percent by weight of glycerine, and/or trimethylolpropane and b. 95 to 50 percent by weight, preferably 90 to 80 percent by weight, based on the total weight of components (a) and (b) of a glycerine and/or trimethylolpropane initiated polyoxypropylenepolyoxyethylene-triol having a hydroxyl number of 28 to 60.

Under certain circumstances, for instance, during the preparation of polyurethane flexible foam by the cold cure process, it may be advantageous to use chain extenders in addition to the mixtures of polyester polyols and polyether polyols. Possible chain extenders include di- and tri-functional compounds having molecular weights of 18 to less than 450, preferably 60 to 300. Preferably used are aliphatic diols with 2 to 6 carbon atoms such as ethylene glycol, 1,4-butanediol, and hexanediol, triols, such as glycerine and trimethylolpropane; and mono-, di- and trialkanolamines such as ethanolamine, N-methyl-diethanolamine and triethanolamine. The amount of chain extender employed depends upon the desired physical properties of the flexible polyurethane flexible foam and may range from 0 to 20 percent by weight, preferably 5 to 15 percent by weight per total weight of the polyester-polyether polyol mixture.

The aromatic polyisocyanates are preferably employed for the preparation of the flexible polyurethane foams according to the process of this invention. These include: mixtures of 2,4'- and 4,4'-diphenylmethane-diisocyanate, mixtures of diphenylmethane-diisocyanate and polyphenyl-polymethylene polyisocyanates containing 55 to 85 percent by weight, preferably 60 to 80 percent by weight, based on the total weight of the mixture of diphenylmethane diisocyanate isomers 2,4- and 2,6-toluenediisocyanate, as well as the corresponding commercially available isomer mixtures of toluenediisocyanates, mixtures of diphenylmethane diisocyanates and polyphenylene polymethylene polyisocyanates containing 30 to 80 percent by weight, preferably 40 to 60 percent by weight, diphenylmethane diisocyanate based on the weight of the mixture (commercially available crude MDI).

Also frequently used are the so-called modified multifunctional isocyanates, that is, products which were produced by the chemical reaction of the above identified polyisocyanates. Possible modified organic polyisocyanates include carbodiimide group containing polyisocyanates according to German Pat. No. 10 92 007, allophanate group containing polyisocyanates, such as described in British Pat. No. 994,890, the published documentation of Belgian Pat. No. 761 626 and published Dutch application No. 71 02 524, isocyanurate group containing polyisocyanates such as are described in German Pat. Nos. 10 22 789, 12 22 067 and 10 27 394 as well as German published application Nos. 19 29 034 and 20 04 048, urethane group containing polyisocyanates, such as are described in the published documentation for Belgian Pat. No. 752 261 or U.S. Pat. No. 3,394,164, acylated urea group-containing polyisocyanates such as are described in German Pat. No. 12 30 778, biuret group containing-polyisocyanates, for example, in accordance with German Pat. No. 11 01 394 and British Pat. No. 889,050; polyisocyanates produced by telemerization reactions, for example, corresponding with the published documentation of Belgian Pat. No. 723 640, and ester group containing-polyisocyanates, such as referred to in British Pat. Nos. 965,474 and 1,072,956, U.S. Pat. No. 3,567,765 and German Pat. No. 12 31 688.

Preferably used, however, are polyisocyanate terminated prepolymers, for instance, 2,4'- and 4,4'-diphenylmethane diisocyanate or toluene diisocyanate modified with low molecular diols, triols or polypropylene glycols, or polyisocyanates containing, carbodimide groups and/or isocyanurate rings, for instance, based on diphenylmethane diisocyanate and/or toluene diisocyanate and particularly, 2,4' and 2,6-toluene diisocyanate as well as the corresponding commercially available isomer mixtures, in a weight ratio of 80:20, and mixtures of toluene diisocyanates and crude MDI.

Blowing agents used for the process according to this invention include water, which reacts with the isocyanate groups thus forming carbon dioxide. The amounts of water employed are 0.01 to 5 percent by weight, preferably 0.1 to 2 percent by weight, based on the weight of the polyester-polyether polyol mixture.

Other blowing agents, which may be used in addition to water, are low boiling liquids which vaporize under the influence of the exothermal polyaddition reaction. Suitable for this purpose are liquids which are inert with respect to the organic polyisocyanates and which have boiling points less than 100° C. at atmospheric pressure, preferably at −40° to +50° C. Examples of such preferably used liquids are halogenated hydrocarbons such as methylene chloride, trichlorofluoromethane, dichlorodifluoromethane, dichloromonofluoromethane, dichlorotetrafluoromethane, and 1,1,2-trichloro-1,2,2-trifluoromethane. Mixtures of these low boiling liquids with each other and/or with other substituted or unsubstituted hydrocarbons may also be used.

The quantity of blowing agent employed is a function of the density which is to be achieved. Generally, quantities of 0.5 to 30 percent by weight, preferably 5 to 20 percent by weight based on the polyester-polyether polyol mixture will provide satisfactory results.

In addition to this, catalysts which accelerate the polyurethane formation and optionally auxiliaries and additives as they are normally used in the preparation of flexible polyurethane foams may be incorporated in the foamable reaction mixture. Examples of these substances are surface active agents, flame retardants, pore regulators, anti-oxidants, hydrolysis protection agents, dyes, fillers, and other additives.

Suitable catalysts for accelerating the reaction between the polyester-polyether polyol mixtures, chain extenders, water and the organic polyisocyanates include, for example, tertiary amines, such as dimethylbenzylamine, N,N,N',N'-tetramethyl-diamino ethyl ether, Bis-(dimethylamino propyl) urea, N-methyl and/or N-ethyl morpholine, dimethylpiperazine, 1,2-dimethyl imidazole, 1-aza-bicyclo-(3,3,0)-octane and preferably triethylenediamine, metals salts, such as tin dioctoate, lead octoate, tin diethylhexoate, and preferably tin-(II) salts and dibutyl tin dilaurate as well as mixtures of tertiary amines and organic tin salts. Preferred concentrations of catalyst employed are 0.5 to 5 percent by weight of tertiary amines and/or 0.05 to 2.5 percent by weight of metal salts, based on the weight of the polyesterpolyether polyol mixture.

Examples of other substances which may be added are surface active substances, which serve to support the homogenization of the starting materials and may be suitable for regulating the cell structure of the flexible polyurethane foams. Examples include siloxane-oxyalkylene-mixed polymers and other organo polysiloxanes, ethoxylated alkylphenols, ethoxylated fatty alcohols, paraffin oils, castor oil, and/or ricinoleic esters and Turkish Red oil, which are used in quantities of 0.2 to 6 parts by weight per 100 parts by weight of polyester-polyether polyol mixture.

In order to improve the flame resistance, flame retardants may be incorporated in the flexible polyurethane foams produced in accordance with this invention. Examples include compounds containing phosphorus and/or halogen atoms, such as tri-cresyl phosphate, tris-2-chloroethyl phosphate, tris-chloropropyl phosphate, and tris-2,3-dibromopropyl phosphate, inorganic flame retardants, such as antimony trioxide, arsenic oxide, ammonium phosphate, ammonium sulfate, and others as well as derivatives of cyanic acid, such as cyanamide, dicyandiamide, guanidine, guanidine salts, biguanide and melamine. Generally it has proven to be advantageous to use 5 to 50 parts by weight of the flame retardant per 100 parts by weight of the polyester-polyether polyol mixture.

More detailed information concerning the above mentioned commonly used auxiliaries and additives are contained in the literature, for example, in the monograph by J. H. Saunders and K. C. Frisch "High Polymers," Volume XVI, Polyurethanes, Parts 1 and 2, Interscience Publishers 1961 and 1964.

For the preparation of the flexible polyurethane foams the NCO to OH groups ratio employed is 0.9:1 to 1.1:1, preferably 1:1 to 1.05:1.

The flexible polyurethane foams may be produced either by the prepolymer or the one shot process. When using a mixing chamber with several feed nozzles, the starting components can be introduced individually and mixed vigorously in the mixing chamber. It has proven to be particularly advantageous to employ a two-component process and to combine the polyester-polyether polyol mixture, catalysts, blowing agents, auxiliaries and additives as component A and the organic polyisocyanates as component B. An advantage of this procedure is that components A and B can be stored separately and may be transported in a space saving manner.

For the preparation of the flexible polyurethane foams, the starting materials as described in the required quantity ratios are vigorously mixed at temperatures of 50° to 60° C., preferably 20° to 35° C. and the reaction mixture is then allowed to foam in open or closed, possibly heated, molds, or as slab foam. The resultant flexible polyurethane foams have densities of approximately 15 to 70 grams per liter. The foams having high densities, for example, 25 to 50 grams per liter, preferably 30 to 45 grams per liter, may be used for sound absorption and as automobile seats. Those with lower density, for example, 15 to 25 grams per liter may be used as backrests for seats.

The flexible polyurethane foams produced in accordance with this invention have a very good resistance to hydrolysis. They have a high compression strength with simultaneously improved damping behavior.

The flexible foams are used for home furnishings, in furniture construction, and in the electrical and automobile industry.

The following examples are employed to illustrate the invention. All parts referred to in the examples are by weight.

EXAMPLE 1

A polyester was prepared by esterfying 73.1 parts of adipic acid, 54.8 parts of a diol mixture consisting of 21 percent by weight of 1,4-butanediol, 52 percent by weight of 1,5-pentanediol, and 27 percent by weight of 1,6-hexanediol, and 2.95 parts by weight of trimethylolpropane under normal pressure employing azeotropic distillation of the water of reaction at temperatures of up to 210° C. Following this and after a pressure reduction to approximately 40 millibars, the esterification process was completed. After separating 18.7 parts by weight of distillate, a polyester polyol was obtained, which was liquid at room temperature, and had the following properties:
OH Number: 49.7 mg KOH/g.
Acid Number: 1 mg KOH/g.
Viscosity (75° C.): 1800 mPas.
Iodine Color Number: 2.

Based on the overall weight, the polyol mixture contained 20 percent by weight of 1,4-butanediol, 48.4 percent by weight of 1,5-pentanediol, 25.6 percent by weight of 1,6-hexanediol, and 5.1 percent by weight of trimethylol propane.

EXAMPLE 2

A polyester was prepared by reacting 73 parts of adipic acid, 58 parts a diol mixture consisting of 22 percent by weight of 1,4-butanediol, 50 percent by weight of 1,5-pentanediol, and 28 percent by weight of 1,6-hexanediol, and 4.4 parts by weight of trimethylolpropane employing the procedure of Example 1. After removing 19.3 parts by weight of distillate, a polyester polyol was obtained which was liquid at room temperature and had the following properties:
OH Number: 63 mg KOH/g.
Acid Number: 0.7 mg KOH/g.
Viscosity (75° C.): 1060 mPas.
Viscosity (25° C.): 13040 mPas.
Iodine Color Number: 1–2.

Based on the total weight, the polyol mixture contained 20.5 percent by weight of 1,4-butanediol, 46.5 percent by weight of 1,5-pentanediol, 26 percent by weight of 1,6-hexanediol, and 7.1 percent by weight of trimethylolpropane.

EXAMPLE 3

A polyester was prepared by esterifying 2,619 parts of adipic acid, 1,963 parts of a diol mixture containing 22 percent by weight of 1,4-butanediol, 50 percent by weight of 1,5-pentanediol, and 28 percent by weight of 1,6-hexanediol, and 103 parts of glycerine employing the procedure of Example 1. After removing 680 parts by weight of distillate, a polyester polyol was obtained which was liquid at room temperature and had the following properties:
OH Number: 59 mg KOH/g.
Acid Number: 1.1 mg KOH/g.
Viscosity (75° C.): 1450 mPas.
Viscosity (25° C.): 18400 mPas.
Iodine Color Number: 1.

Based on the overall weight, the polyol mixture contained 20.9 percent by weight of 1,4-butanediol, 47.5 percent by weight of 1,5-pentanediol, 26.6 percent by weight of 1,6-hexanediol, and 5 percent by weight of glycerine.

EXAMPLE 4

A blend of 50 parts of the polyester polyol of Example 1 and 50 parts of a polyether polyol prepared from glycerine, propylene oxide, and ethylene oxide having an OH number of 42 was made by mixing until a clear liquid was obtained.

After a prolonged storage period, the mixture did not show any clouding, precipitation, or phase separation.

A polyurethane foam was prepared by reacting 100 parts of this polyester-polyether polyol mixture,
3.6 parts of water,
1.5 parts of N,N-dimethylbenzylamine
1.2 parts of foam stabilizer (Niax ® L 532 by Union Carbide Corporation) with 42.2 parts by weight of toluene diisocyanate (ratio of 2,4:2,6-isomers 80:20).

The physical properties of the resultant hydrolysis resistant polyester-polyether polyurethane foam are listed in Table I.

Comparison Example A

The process of Example 4 was employed with the exception that 100 parts of a commercially available polyester polyol based on adipic acid, diethylene glycol and trimethylolpropane with an OH number of 50 was employed as the polyol. The physical properties are listed in Table I.

Comparison Example B

The process of Example 4 was employed with the exception that 100 parts of a polyether polyol based on glycerine, propylene oxide and ethylene oxide having an OH number of 42 was employed as the polyol. The physical properties are listed in Table I.

TABLE I

| Physical Properties | | Example 4 | Comparison Example A | Comparison Example B |
|---|---|---|---|---|
| Density according to DIN 53 420 | [kg/m³] | 36 | 36 | 35.5 |
| Tensile Strength according to DIN 53 571 | [k · Pa] | 185 | 165 | 120 |
| Breaking Elongation according to DIN 53 571 | [%] | 215 | 195 | 180 |
| Compression Strength according to DIN 53 577 with a compression of 40% | [k · Pa] | 4.7 | 4.4 | 4.1 |
| Compression set according to DIN 53 572 at 90% compression | [%] | 6.5 | 7.8 | 5.2 |
| Reduction of the compression after storage at 85° C. and maximum relative humidity for five days (according to DIN 53 578) | [%] | 13 | 45 | 12 |

These results show that the polyester foam according to Comparison Example A, based on a commercially available polyester polyol hydrolyzed within a brief period of time. The reduction of the compression strength after exposure to maximum relative humidity at 85° C. for five days, amounted to 45%. On the other hand, the polyester-polyether polyurethane foam produced in accordance with this invention showed almost an identical reduction in the compression strength after being moisture aged as the pure polyether polyurethane foam (Comparison Example B) but had markedly improved physical properties when compared with a pure polyether polyurethane foam.

EXAMPLE 5

A polyurethane foam was prepared by reacting a mixture of 50 parts of the polyester polyol of Example 2 and 50 parts by weight of a polyether polyol based on a glycerine, propylene oxide, and ethylene oxide having a hydroxyl number of 56, and
3.5 parts by weight of water,
0.7 parts by weight of silicone stabilizer (BF 2370 by Goldschmidt in Essen)
0.36 parts by weight of diazobicyclo octane and
0.06 parts by weight of tin (II)-octoate with 45.0 parts by weight of toluene diisocyanate (2,4:2,6-isomer ratio 80:20) at 25° C., in a mold.

The resultant properties of the polyurethane foam are listed in Table II.

Comparison Example C

The process of Example 5 was employed with the exception that 100 parts of a polyether polyol based on glycerine, propylene oxide, and ethylene oxide having an OH number of 56 was employed instead of the polyester-polyether polyol mixture. The physical properties are listed in Table II.

TABLE II

| | | Example 5 | Comparison Example C |
|---|---|---|---|
| Density according to DIN 53 420 | [kg/m³] | 29 | 29 |
| Tensile Strength according to DIN 53 571 | [K · Pa] | 142 | 130 |
| Breaking Elongation according to DIN 53 571 | [%] | 215 | 195 |
| Compression Strength according to DIN 53 577 at 40% compression | [K · Pa] | 4.8 | 4.1 |
| Compression set according to DIN 53 573 at 90% compression | [%] | 4.9 | 5.4 |
| Reduction of the compression strength after storage at 85° C. and maximum relative humidity (according to DIN 53 578) for five days | [%] | 15 | 14 |

The foam samples were heated at 250° C. for 15 minutes. The results show that while using comparable foaming conditions, a polyester-polyether polyurethane foam was obtained which had remarkedly improved mechanical properties particularly the compression strength, tensile strength, and breaking elongation with nearly the same good resistance to hydrolysis as compared with a pure polyether polyurethane foam.

Furthermore marked differences in the acoustical insulation properties are obtained. This is shown in Table III.

TABLE III

|  | Example 5 | Comparison Example C |
|---|---|---|
| Degree of sound absorption at |  |  |
| 250 Hz | 30% | 15% |
| 500 Hz | 65% | 32% |
| 750 HZ | 85% | 55% |

EXAMPLE 6

A polyurethane foam was prepared by reacting a mixture of 40 parts of the polyester polyol of Example 2, 60 parts by weight of a polyether polyol based on glycerine, propylene oxide and ethylene oxide having an OH number of 42, produced by condensation of a heteric propylene oxide-ethylene oxide mixture, 3.0 parts by weight of water 1.0 parts by weight of silicone stabilizer (BF 2370 by Goldschmidt in Essen)

0.3 parts by weight of diazabicyclo octane and 0.2 parts by weight of tin (II)-octoate, with 38.5 parts by weight of toluene diisocyanate (2,4-:2,6-isomer ratio 80:20) at 25° C.

The physical properties of the resultant polyester-polyether polyurethane foam are listed in Table IV.

Comparison Example D

A polyurethane foam was prepared employing the process of Example 6, with the exception that 100 parts of the polyether polyol of Example 6 was employed instead of the polyester-polyether polyol mixture.

TABLE IV

|  |  | Example 6 | Comparison Example D |
|---|---|---|---|
| Physical Properties |  |  |  |
| Density according to DIN 53 420 | [kg/m³] | 33.1 | 31.9 |
| Tensile Strength according to DIN 53 571 | [K · Pa] | 182 | 135 |
| Breaking Elongation according to DIN 53 571 | [%] | 219 | 180 |
| Compression Strength according to DIN 53 577 at 40% compression | [K · Pa] | 3.8 | 3.4 |
| Compression Set according to DIN 53 573 at 90% compression | [%] | 4.5 | 4.6 |

The physical properties of the polyurethane foam parts show a higher tensile strength, breaking elongation, and compression strength in the polyester-polyether polyurethane foams produced according to this invention with the otherwise comparable physical properties of the polyether polyurethane foams.

EXAMPLE 7

A mixture consisting of 20 parts of the polyester polyol of Example 2, 80 parts by weight of a polyether polyol based on glycerine, propylene oxide, and ethylene oxide having an OH number of 35 and an amount of approximately 80 percent of primary hydroxyl groups produced by block polymerization of ethylene oxide and propylene oxide, 2.8 parts by weight of water 0.6 parts by weight of silicone stabilizer (B 4113 by Goldschmidt in Essen)

0.6 parts by weight of diazabicyclo octane and 0.3 part by weight of dimethylethanol amine was reacted with 29.4 parts by weight of toluene diisocyanate (2,4-:2,6-7.4 parts by weight of a mixture of diphenylmethane diisocyanates and polyphenyl-polymethylene polyisocyanates (crude MDI).

at 25° C. The reaction mixture was introduced into an aluminum mold, with the aid of a high pressure foaming machine, heated to 45° C., and was allowed to react without supplying additional heat.

The cold cured foam obtained had the physical properties summarized in Table V.

Comparison Example E

The process of Example 7 was employed with the exception that 100 parts of the polyether polyol of this example were used instead of the polyester-polyether polyol mixture.

TABLE V

|  |  | Example 7 | Comparison Example E |
|---|---|---|---|
| Physical Properties |  |  |  |
| Density according to DIN 53 420 | [kg/m³] | 44.0 | 44.5 |
| Tensile Strength according to DIN 53 571 | [K · Pa] | 95 | 72 |
| Breaking Elongation according to DIN 53 571 | [%] | 141 | 130 |
| Compression Strength according to DIN 53 577 at 40% compression | [K · Pa] | 3.6 | 3.0 |
| Elasticity according to ASTM D 2406-73 | [%] | 56.3 | 59.8 |

The resultant values showed that the physical properties, particularly the tensile strength, breaking elongation, and compression strength were increased in the case of the polyester-polyether-polyurethane foams.

EXAMPLE 8

The process of Example 7 was employed with the exception that 50 parts of the polyester polyol of Example 2 and 50 parts of the polyether polyol, of Example 7 were employed instead of the polyester and polyether polyol quantities referred to in Example 7. The resulting polyester-polyether-polyurethane foam had a particularly good damping behavior as may be seen in the deformation diagram of FIG. 2.

FIG. 1 shows the deformation diagram of a pure polyether-polyurethane foam based on 100 parts by weight of the polyether polyol of Example 7 under otherwise equal process conditions.

These results indicate that good damping properties with simultaneously increased bearing capacity are achieved. These foams are particularly useful for vehicle seats as well as for increasing the internal safety in motor vehicles, for example, as protective padding.

The embodiments of the invention in which an exclusive privilege or property is claimed are defined as follows:

1. A process for the preparation of flexible polyurethane foams by reacting organic polyisocyanates, polyhydroxyl compounds and optionally chain extenders in the presence of catalysts and blowing agents as well as auxiliaries wherein the polyhydroxyl compounds consist of mixtures of
(a) liquid polyester polyols with hydroxyl numbers of 40 to 80 and molecular weights of 1500 through 5000 which are produced by polycondensation of organic dicarboxylic acids with a polyol mixture which contains based on the overall polyol weight:
10 to 50 weight of 1,4-butanediol,
30 to 60 percent by weight of 1,5-pentanediol,
8 to 35 percent by weight of 1,6-hexanediol, and
2 to 15 percent by weight of at least one triol, and
(b) di- to tetra-functional polyether polyols having molecular weights of 1500 to 6000.

2. The process of claim 1 wherein the polyhydroxyl compound mixtures consist of
(a) 5 to 50 percent by weight, preferably 10 to 20 percent by weight of (a) a liquid polyester polyol, and
(b) 95 to 50 percent by weight, preferably 90 to 80 percent by weight, of (b) a di- to tetra-functional polyether polyol.

3. The process according to claim 1 wherein trimethylolpropane and/or glycerine are used as the triols.

4. The process of claim 1 wherein adipic acid is used as the organic dicarboxylic acid.

5. The process of claim 1 wherein di- and/or tri-functional polyoxypropylene-polyoxyethylene polyols having hydroxyl numbers of 28 to 60 are used as the polyether polyols.

6. The process of claim 1 wherein the polyhydroxyl compounds consist of mixtures containing
(a) 10 to 20 percent by weight based on the total weight of components (a) and (b), a liquid polyester polyol having a hydroxyl number of 40 to 80 produced by the polycondensation of organic dicarboxylic acids with a polyol mixture containing the following based on the total weight of the polyhydroxyl compounds:
10 to 50 percent by weight of 1,4-butanediol,
30 to 60 percent by weight of 1,5-pentanediol,
8 to 35 percent by weight of 1,6-hexanediol, and
2 to 15 percent by weight of glycerine and/or trimethylolpropane, and
(b) 90 to 80 percent by weight based on the total weight of components (a) and (b), a di- and/or tri-functional polyoxypropylene-polyoxyethylene polyol having a hydroxyl number of 28 to 60.

7. Polyester-polyether polyol mixtures which consist
(a) 10 to 20 percent by weight based on the overall weight of components (a) and (b) a liquid polyester-polyol having a hydroxyl number of 40 to 80 produced by polycondensation of adipic acid with a polyol mixture which contains based on the overall weight of the polyester-polyether polyol mixture:
10 to 50 percent by weight of 1,4-butanediol,
30 to 60 percent by weight of 1,5-pentanediol,
8 to 35 percent by weight of 1,6-hexanediol, and
2 to 15 percent by weight of glycerine and/or trimethylolpropane, and
(b) 90 to 80 percent by weight based on the overall weight of components (a) and (b) of a glylcerine and/or trimethylolpropane initiated polyoxypropylene-polyoxyethylene triol having a hydroxyl number of 28 to 60.

* * * * *